Patented Feb. 6, 1923.

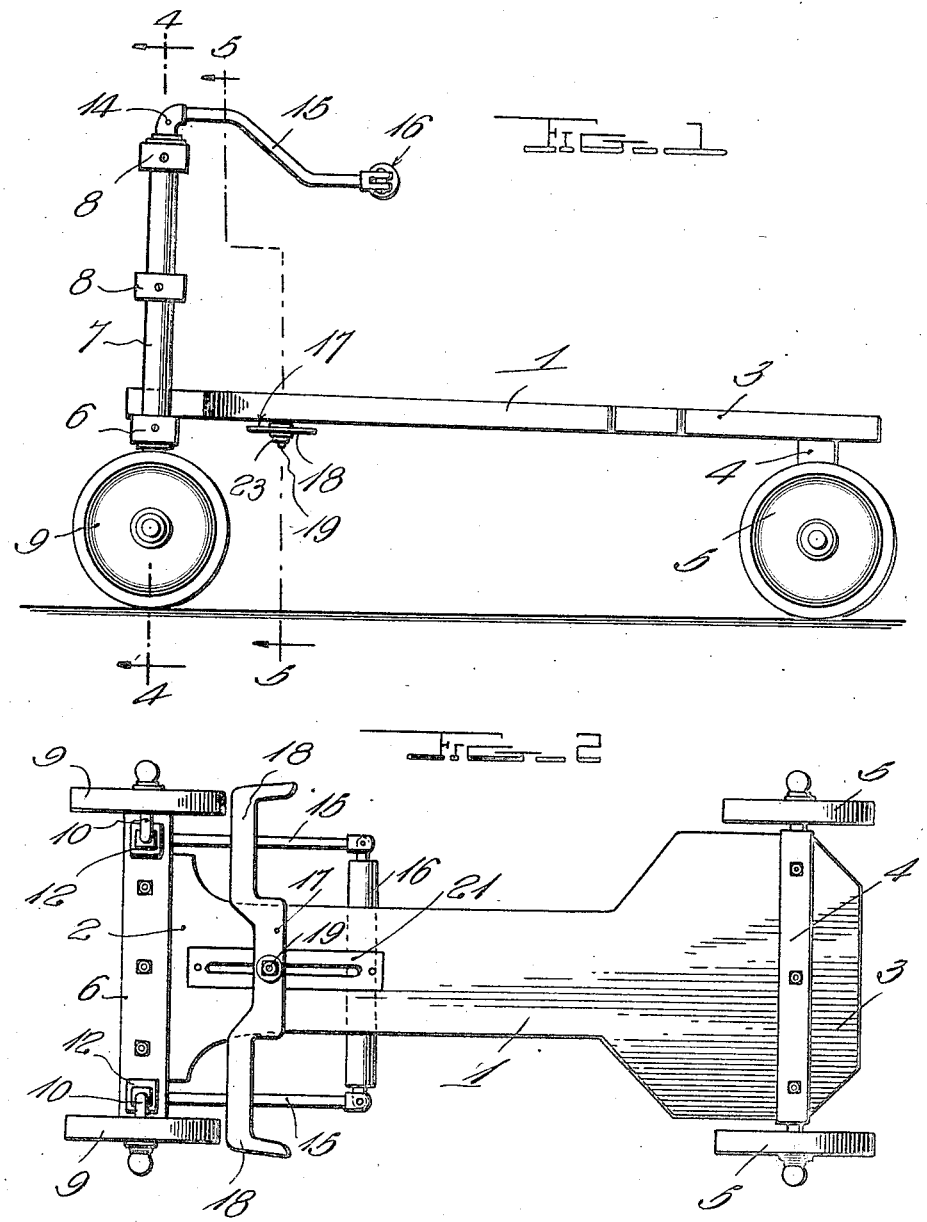

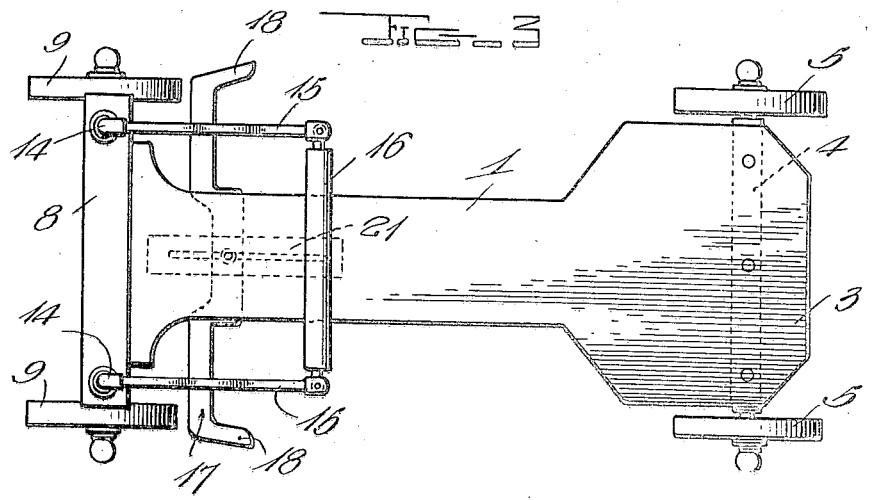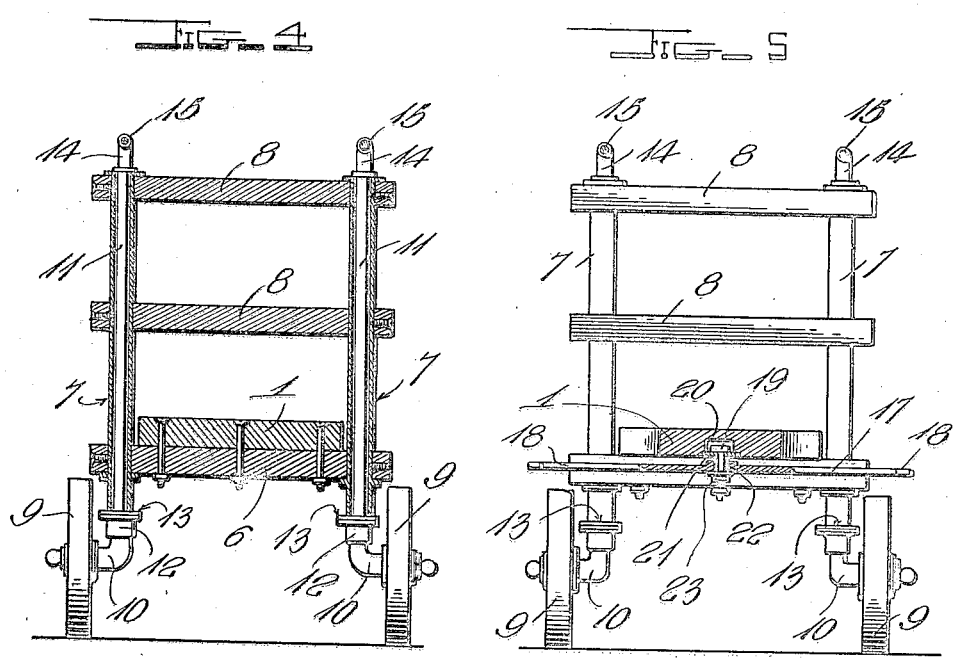

1,444,238

UNITED STATES PATENT OFFICE.

FERDINAND DAVIS, OF NEW GENEVA, PENNSYLVANIA.

COASTER.

Application filed April 17, 1922. Serial No. 553,479.

*To all whom it may concern:*

Be it known that I, FERDINAND DAVIS, a citizen of the United States, residing at New Geneva, in the county of Fayette and State of Pennsylvania, have invented certain new and useful Improvements in Coasters; and I do declare the following to be a full, clear, and exact description of the invention, such as will enable others skilled in the art to which it appertains to make and use the same.

This invention relates to an improved coaster and one object of the invention is to provide the coaster with improved steering means and to also provide an improved type of foot-rest.

Another object of the invention is to so mount the foot-rest that it may have pivotal movement and to further so mount this foot-rest that it may be adjusted longitudinally of the platform of the coaster and thus permit children of different ages to make use of the coaster.

Another object of the invention is to so construct the steering mechanism that the vehicle may be provided with two front wheels instead of one and have both of these wheels turned at the same time thus permitting the vehicle to be easily guided and to reduce danger of the vehicle turning over when making a turn or going over rough places in a road down which the coaster is moving.

Another object of the invention is to provide a coaster which will have a simple construction and will be very strong and durable.

This invention is illustrated in the accompanying drawings, wherein:

Figure 1 is a view showing the improved coaster in side elevation.

Figure 2 is a bottom plan view of the improved coaster.

Figure 3 is a top plan view of the improved coaster.

Figures 4 and 5 are sectional views taken along the lines 4—4 and 5—5 respectively of Fig. 1.

This coaster is provided with a platform 1 which has its forward end portion 2 widened and has its rear end portion 3 also widened so as to provide a seat upon which a cushion may be placed if so desired. A bolster 4 is secured across the seat portion 3 of the platform and the rear wheels 5 are connected with the ends of this bolster. The rear portion of the coaster will thus be constructed in the manner usually employed in connection with vehicles of this character.

The forward end portion 2 of this platform carries a bolster 6 which is secured by bolts as shown in Fig. 4 and extends beyond the sides of the platform and is provided with openings through which extend vertically disposed tubes or standards 7 which are braced by cross bars 8. The front wheels 9 are rotatably mounted by axle elements 10 which have a caster construction and are provided with upwardly extending pivot rods 11 which extend through the sleeves 7. Collars 12 are carried by the casters and fit beneath outstanding flanges 13 at the lower ends of the sleeves. If desired these collars and flanges may be formed as bearing members so that bearing balls may be provided between them to permit easy turning. The pivot rods which may be posts extend upwardly above the upper ends of the sleeves 7 and carry coupling elbows 14 which carry arms 15 constituting levers by means of which the posts may be rotated to turn the steering wheels 9. The lever arms 15 are pivotally connected with the ends of a handle bar 16 and it will be readily seen that when the occupant of the coaster moves the handle bar, the two wheels 9 will be simultaneously turned and thus the coaster may be easily steered and a turn made without danger of the coaster turning over.

A foot supporting bar 17 is positioned beneath the platform and has its end portions extending beyond the sides of the platform and formed into stirrup elements 18 to receive the feet of the operator of the coaster. In order to mount this foot bar, there has been provided a bolt 19 which has its head positioned in a groove 20 formed longitudinally of the platform in the under surface thereof. This bolt extends through a slotted plate 21 and carries a sleeve 22 which extends through the foot bar. Therefore when the securing nut 23 is tightened, the bolt 19 will be firmly held in place but the foot bar will be permitted to have swinging movement. It will thus be seen that by loosening the securing nut, the bolt may be moved longitudinally of the slotted plate 21 and thus the foot bar positioned at a convenient point and the securing nut then again tightened.

When this device is in use, the operator sits upon the rear end portion of the platform 1 and will place his feet upon the stirrup forming portions 18 of the foot bar. He can then coast down an incline such as a pavement or street and by holding onto the handle bar 16, can readily guide the coaster. The provision of two steering wheels 9 instead of one intermediate the width of the coaster permits the coaster to be steered easily and as previously explained prevents tendency of the coaster to turn over when making a turn. There has thus been provided a coaster which will be steered easily and prevented from turning over and further there has been provided a coaster having a foot rest which can be adjusted to the most convenient point.

I claim:

1. A coaster comprising a platform, vertically disposed tubular standards upon opposite sides of the forward end portion of the platform, front and rear wheels, caster elements for the front wheels having vertically disposed post portions extending through and rotatable in the standards, levers connected with the protruding upper ends of the posts and extending rearwardly, and a handle bar extending between and pivotally connected with the levers.

2. A coaster comprising a platform, a bolster extending transversely of the forward end portion of the platform, tubular standards extending through and above the end portions of the bolster, steering wheels, caster axle elements for the steering wheels having pivot rods extending upwardly through the standards, levers extending from the upper ends of the pivot rods above the standards, and a handle bar extending between and pivotally connected with the levers whereby the steering wheels may be simultaneously turned.

3. The structure of claim 2 having the tubular standards provided with collars limiting downward movement of the bolster upon the standards, and bracing bars connecting the standards above the platform to hold the standards in a vertical position.

In testimony whereof I have hereunto set my hand.

FERDINAND DAVIS.